Figure 1:
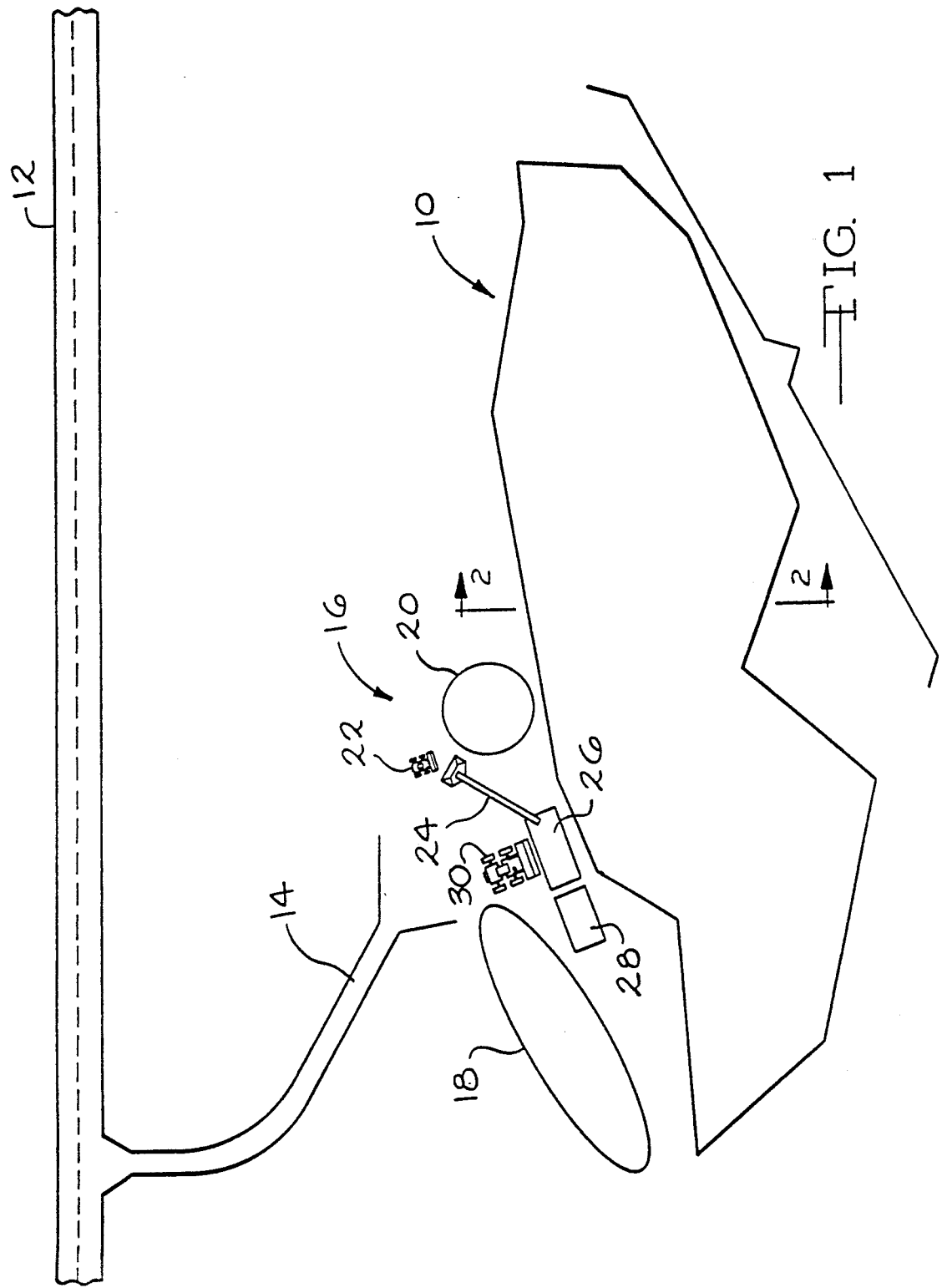

United States Patent [19]
Sierzega

[11] Patent Number: 5,249,889
[45] Date of Patent: Oct. 5, 1993

[54] SOIL-LESS METHOD FOR THE RECLAMATION OF DISTURBED AREAS

[75] Inventor: Philip E. Sierzega, Okemos, Mich.

[73] Assignee: Great Lakes/Enviroland, Inc., DeWitt, Mich.

[21] Appl. No.: 874,523

[22] Filed: Apr. 27, 1992

[51] Int. Cl.$^5$ .............................. B09B 3/00
[52] U.S. Cl. ................... 405/128; 210/747; 405/258; 588/252; 588/257
[58] Field of Search ............... 405/128, 129, 258; 588/249, 256, 257, 252; 210/705, 751, 747

[56] References Cited

U.S. PATENT DOCUMENTS

| | | |
|---|---|---|
| 3,476,683 | 11/1969 | Liljegren . |
| 3,732,697 | 5/1973 | Dickson ........................ 405/129 |
| 4,028,130 | 6/1977 | Webster et al. . |
| 4,270,279 | 6/1981 | Roediger . |
| 4,306,978 | 12/1981 | Wurtz . |
| 4,354,876 | 10/1982 | Webster ........................ 405/129 |
| 4,374,672 | 2/1983 | Funston et al. ............. 405/129 X |
| 4,432,666 | 2/1984 | Frey et al. .................. 405/129 X |
| 4,554,002 | 11/1985 | Nicholson . |
| 4,615,809 | 10/1986 | King .......................... 405/129 X |
| 4,759,664 | 7/1988 | Deal .......................... 405/303 X |
| 4,761,893 | 8/1988 | Glorioso . |
| 4,762,623 | 8/1988 | Kapland ........................ 405/128 |
| 4,815,963 | 3/1989 | Berkhout .................... 405/129 X |
| 4,852,269 | 8/1989 | Glorioso . |
| 4,931,192 | 6/1990 | Covington et al. ......... 405/129 X |
| 4,997,572 | 3/1991 | Wurtz . |
| 5,000,618 | 3/1991 | Greenley .................... 405/129 X |

Primary Examiner—Dennis L. Taylor
Attorney, Agent, or Firm—Ian C. McLeod

[57] ABSTRACT

A method is described for making an aggregate mixture (32) from by-products of waste disposal plants to reclaim disturbed area (10) without the use of either native soil or similar trucked in earth materials. The waste materials used include water plant lime sludges, coal ashes (bottom and precipitated fly), wood ashes (bottom and precipitated fly), crushed or chipped concrete waste from ready-mix concrete plants, and yard waste compost. A disturbed area is reclaimed using the ashes or concrete waste materials in varying combination with the lime sludge. The pH characteristics and low permeability of lime sludge are used to prevent any heavy metals and other potential pollutants in the ashes from leaching into the ground water. The yard waste compost material (38) is then layered over the lime sludge/ash/concrete aggregate mixture to serve as a final cover and to support the growth of permanent vegetation (40). The reclaimed area is in compliance with applicable environmental regulations and is completed without excavation or use of native, or transported soils and like earth materials.

10 Claims, 2 Drawing Sheets

SOIL-LESS METHOD FOR THE RECLAMATION OF DISTURBED AREAS

BACKGROUND OF THE INVENTION (1Field of the Invention

The present invention relates to a method for reclamating disturbed land areas without the excavation and use of earth materials. In particular, the present invention relates to a method for using relatively abundant non-hazardous residue waste materials to reclaim disturbed land areas. The waste materials preferably comprise a foundation of lime sludge combined with ash waste materials and/or concrete waste materials that need an environmentally acceptable method of disposal or utilization. As a solution, the waste materials are first rendered leach resistant by the method of the present invention. The leach resistant waste materials are then used as a fill material in land areas such as sand pits, gravel or stone pits, quarries, strip mine areas, mined areas, borrow pits, and other areas that have been disturbed by removal of earth materials. The reclamation process is thus unique in that it does not include the use of any earth materials such as soil, gravel, sand and the like that must be excavated to serve as fill material, thereby creating another pit or disturbed area. Finally, yard waste compost comprised of materials such as fugitive soil, leaves, grass clippings, tree trimmings and the like that have previously been composted are layered over the filled in waste materials. The yard waste compost provides for the establishment and support of vegetative growth as a cover over the reclaimed area. Therefore, the method of the present invention also eliminates the need to strip mine top soil to establish a suitable medium for vegetative growth.

(2) Prior Art

Lime sludge or residual lime sludge is waste material that is formed as a by-product when water is subjected to a softening process. The increased need for softened water in both public water systems and industrial water systems has resulted in an abundance of lime sludge. For decades, lime sludge material has been disposed of by placing a slurry of lime sludge containing between about 1% to 10% total solids into an impoundment reservoir. The lime sludge is then allowed to thicken and dewater through various methods including filtration/percolation, evaporation, or settling and supernatant removal through a decant structure. These methods increase the percent of total solids in the lime sludge to about 45% with the balance being water. The total solids accumulation rate of lime sludge held in the impoundment reservoir is therefore dependent on the rate of lime sludge generation and the size of the impoundment reservoir being filled. Once the impoundment reservoir holds a useable quantity of lime sludge, the lime sludge is removed from the impoundment reservoir and disposed of into an approved landfill (lined to contain the deposited materials) or applied on agricultural land as a soil conditioner.

However, what is needed is an alternative to these practices. The problem is that landfilling is increasing in cost as the availability of landfill space diminishes, making this method of disposal economically prohibitive. Also, the amount of lime sludge that can feasibly be used as a soil conditioner does not approach the large quantities that are in need of proper disposal. Furthermore, the increased supply over demand for lime sludge as a soil conditioner is making this method of disposal only marginally economical.

Another method useful for disposing of lime sludge is described in U.S. Pat. No. 4,852,269 to Glorioso, which combines a method for disposing of sewage sludge with a method for disposing of lime sludge. The lime sludge, which is produced as a by-product of water treating, is first reclaimed to product lime. The product lime can then be used as a softener in municipal water treatment. The process of reclaiming lime sludge is typically carried out at elevated temperatures and produces off gases that can be used to aid in drying and pelletizing the sewage sludge. The sewage sludge pellets can then be used as a soil conditioner. The problem is that more lime sludge is produced during the water treating process than is needed to be reclaimed to produce lime for later use as a water treatment additive. The net result is a build up of lime sludge that needs an acceptable method of disposal.

The prior art has also described various methods for stabilizing waste water or sewage sludge to form a hardened composition that can be used as a landfill. This method is described in U.S. Pat. No. 4,028,130 to Webster et al where sewage sludge is combined with certain types of cementitious reactants, such as hydrated lime and fly ash, to form hardenable compositions. These compositions can also include alkaline earth metal sulfates and/or soil or other inert or complimentary additives. These hardenable compositions may be placed in a suitable site, open to the atmosphere where landfill or road base is needed and then permitted to harden over a period of time.

Other methods for disposing of waste water sludge or sewage sludge generally comprise the steps of preliminarily dewatering the sludge to increase its dry solids content and then adding a cementitious reactant such as calcium (quicklime) and/or fly ash to further dry and sterilize the sewage sludge. The resulting product can then be formed into granules or pellets that are useful as an agricultural fertilizer. The pellets can be scattered by a conventional fertilizer spreader. Illustrative of this prior art is U.S. Pat. Nos. 3,476,683 to Liljegren; 4,270,279 to Roedioer; 4,306,978 to Wurtz; 4,554,002 to Nicholson; 4,761,893 to Glorioso and 4,997,572 to Wurtz.

What is needed is an alternate method or process for disposing of lime sludge that does not require that the lime sludge be deposited in an approved landfill or used in an agricultural application as a soil conditioner. Landfills are rapidly decreasing in availability resulting in a dramatic increase in the cost of landfilling disposable materials. Also, unstable waste water sewage sludge can create serious environmental concerns relative to leaching and ground water contamination. Furthermore, disposing of lime sludge in a fertilizer application is an increasingly used practice that has reached the point of demand saturation. Thus, the cost benefit of this disposal method has decreased to the point of being marginal.

Similar to lime sludge, ash materials, which are the residue of coal and wood combustion (bottom ashes and/or precipitated fly ashes) are very plentiful and their disposal or utilization is a primary concern to generators of these materials and those officials responsible for overseeing and enforcing landfill regulations. The major concerns with respect to ash materials include fugitive dust loss of the ashes into the air, leaching of pollutants contained in the ashes to ground water and surface run off of ash particulate into surface waters. As with lime sludge, disposal of ash materials in landfills is an economically expensive solution. In addition, ash materials contain appreciable amounts of heavy metals that can leach into the ground water if the ash materials are not first rendered leach resistant. This is a major concern for landfill operators and prohibits their use as an agricultural soil conditioner. Therefore, what is also needed is an economically and environmentally acceptable means of disposing of residue ash materials.

For the same reasons, the disposal of concrete waste materials in landfills is economically prohibitive. In addition, the finely powered composition of dry concrete material makes it difficult to use in a fertilizer application.

OBJECTS

It is therefore an object of the present invention to provide a method for reclaiming a disturbed land area without the use of soil or other like earth materials. Further, it is an object of the present invention to provide a method for disposing of lime sludge that is environmentally safe and acceptable to those people who are responsible for overseeing and enforcing regulations governing waste disposal. Furthermore, it is an object of the present invention to provide a method for combining lime sludge with ash waste materials so that the ash materials are rendered resistant to leaching and can then be filled into a disturbed land area as a fill material. Still further, it is an object of the present invention to provide a method for combining lime sludge with concrete waste materials so that the resulting compound can be placed into a disturbed land area to reclaim the land area. Finally, it is an object of the present invention to provide a method for combining lime sludge with an ash waste material and/or a concrete waste material that is relatively inexpensive to practice and is also an economically feasible alternative to placing the lime sludge and residue waste materials into a landfill or disposing of them on cropland as an agricultural fertilizer. These and other objects will become increasingly apparent by reference to the drawings and to the following descriptions.

IN THE DRAWINGS

FIG. 1 is a schematic view showing a typical equipment system and site plan for reclaiming a disturbed land area 10 using the method of the present invention.

Figure 2:
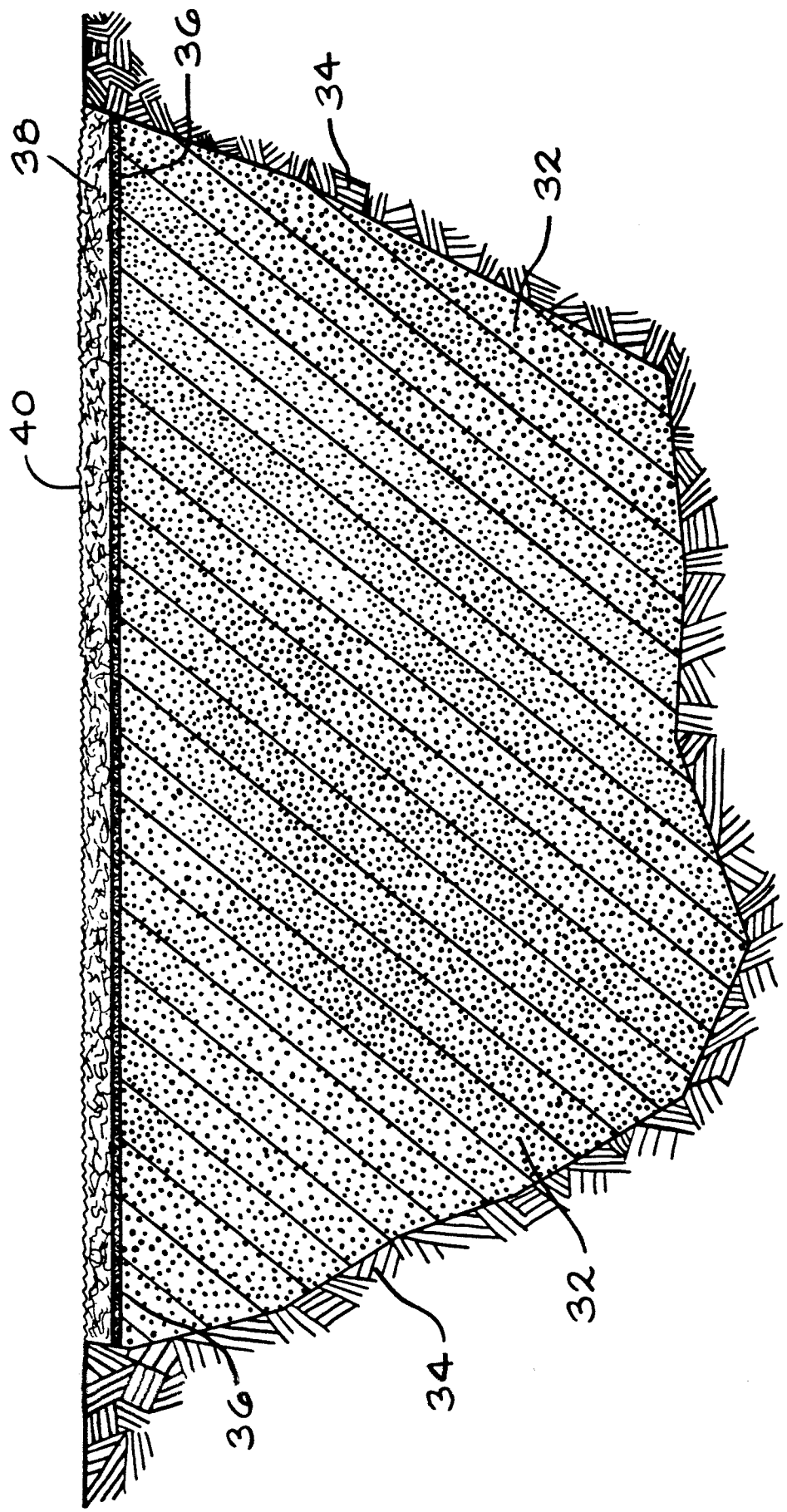

FIG. 2 is a cross-sectioned view along line 2—2 of FIG. 1 showing the disturbed area 10 dug into the earth 32 and filled in using an aggregate mixture 30 made according to the method of the present invention.

GENERAL DESCRIPTION

The present invention relates to a method for reclaiming a disturbed land area by filling in the disturbed area with a fill mixture, which comprises: providing a mixer means and feeding a residue ash and/or concrete material into the mixer means so that the residue material is thoroughly ground and pulverized; mixing a lime sludge with the residue material to render the residue material resistant to leaching and to thereby form the fill mixture; and filling the mixture into the disturbed land area.

Furthermore, the present invention relates to a mixture useful as a fill material, which comprises: a first portion comprised of at least one of the group of a plant ash material, a coal ash material and a concrete waste material; and a second portion comprised of a lime sludge having a total solids content of between 10% and 45% by volume wherein the first portion to the second portion are mixed in a ratio of up to 1:1 by volume to form the fill material.

SPECIFIC DESCRIPTION

In many municipalities, the water supply must be treated to "soften" it before the water is ready for distribution and consumption. The problem is that the municipal water source contains excessive concentrations of calcium and magnesium salts. This "hard" water requires excessive quantities of soap, and leaves scum that may stain fabrics. It is therefore desirable to treat the water to remove these calcium and magnesium salts before the water is provided to end users.

A common water treatment process involves the addition of lime, or lime and soda ash, to the water to precipitate calcium and magnesium salts as calcium carbonate and magnesium hydroxide. This process however results in a by-product called lime sludge, which presents a disposal problem. Typically, lime sludge is treated to initially remove the magnesium hydroxide and then it is recalcined to regenerate lime from the sludge for reuse in the water treatment process. This method then minimizes the disposal problem of lime sludge relative to the water treatment process. The problem is that more lime sludge is generated in treating water than is needed to be recalcined to product lime for the water treating process. This excess lime sludge can be disposed of in an approved landfill or used as a fertilizer supplement on agricultural lands and the like. However, both of these solutions have drawbacks which make them increasingly cost prohibitive, as has previously been discussed. An economically sound alternative to landfilling the lime sludge or using it as a fertilizer supplement is to combine the lime sludge with ash waste materials and/or concrete waste materials to render the ingredients chemically inert. The resulting mixture is then an acceptable fill for reclaiming disturbed land areas, without the need to use soil and other like earth materials.

Thus, the residual lime sludge from the water treatment process that is not recalcined to product lime for further water treatment can be used in the process described hereinafter in detail. For a better understanding of the present invention, however, a brief review of the chemical reactions that occur during the water treatment process follows. First, lime, also known as quicklime, CaO, is slaked to produce calcium hydroxide.

$$CaO + H_2O = Ca(OH)_2$$

The reaction between the calcium hydroxide and the dissolved carbon dioxide and bicarbonate alkalinity are:

$$CO_2 + Ca(OH)_2 = CaCO_3 + H_2O$$

$$Ca(HCO_3)_2 + Ca(OH)_2 = 2CaCO_3 + 2H_2O$$

Magnesium carbonate and magnesium hydroxide are precipitated by the reaction with calcium hydroxide:

$$Mg(HCO_3)_2 + Ca(OH)_2 = CaCO_3 + MgCO_3 + 2H_2O$$

$$MgCO_3 + Ca(OH)_2 = CaCO_3 + Mg(OH)_2$$

The solubility of magnesium hydroxide is pH dependent, therefore, carbon dioxide is added as required to facilitate calcium carbonate precipitation.

$$Ca^{++} + 2OH^- + CO_2 = CaCO_3 + H_2O$$

Following formation of the calcium carbonate, soda ash is added to remove non-carbonate hardness:

$$MgSCO_4 + Ca(OH)_2 = Mg(OH)_2 + CaSO_4$$

$$CaSO_4 + Na_2CO_3 = CaCO_3 + Na_2SO_4$$

In place of soda ash, Caustic soda, NaOH, can be used.

The resulting lime sludge, comprising $CaCO_3$, $MgCO_3$ and $Mg(OH)_2$ is then combined with ash waste materials, such as coal and wood ash materials. These ash materials are generally in the form of bottom ashes and/or precipitated fly ashes and are derived from the combustion of coal and/or wood chips in a furnace, such as a boiler, used during the generation of steam, power or heat.

The bottom ashes are the residue of the combustion process and are typically heavy particles having a high silica content. The bottom ashes are normally removed from the boiler in a dry form and either disposed of in a landfill or mixed with fly ashes in an impoundment system. Fly ashes on the other hand, are removed from the airflow leaving the furnace by the air pollution control system. These fine particles of ash would otherwise be released into the atmosphere and result in degradation of the environment. Fly ash is a finely divided material that includes some unburned carbon, but mostly it is comprised of various silica alumina and iron compounds present in a variety of forms, including finely divided spherical glassy particles. The precipitated fly ashes are either removed from the air pollution control system as a dry material and are disposed of in a landfill along with the bottom ashes or mixed with water and slurried to an impoundment reservoir for additional dewatering, storage, or ultimate disposal.

As an alternative, the method of the present invention uses the coal/wood ash waste materials in a mixture with the lime sludge to form a cementitious compound that is suitable for disposal in a disturbed land area. The pH characteristics and low permeability of lime sludge are used to prevent any heavy metals and other potential pollutants in the ash waste materials from leaching into the ground water. The mix ratio of ash(es) to lime sludge will depend on: (1) the quantity of ash available, (2) chemical composition of the ash, (3) the percent solids content of the lime sludge, and (4) the ability of the lime sludge to render the availability of the heavy metals in the residue ash material resistant to leaching and thus unable to move into the ground water as a pollutant. The actual ratio of ash(es) to lime sludge will range from 0 to 1:1 on a vol/vol basis depending upon the amount of concrete waste materials used.

Concrete waste materials can also be combined with lime sludge, with or without the ash waste materials, and then used to reclaim disturbed land areas. In a similar manner as ash materials, concrete waste materials in the form of concrete wastes and concrete dust present a disposal problem. The concrete waste is usually formed during the rinsing and cleaning of equipment used in the preparation and distribution of concrete. Concrete dust is generally a by-product of manufacturing concrete and of dehydrating the concrete rinse. Although the concrete waste materials are usually not contaminated and are chemically inert, their disposal is a growing concern to those in the cement industry for many of the same reasons applicable to the disposal of lime sludge and coal and wood ash materials. For one, the availability of landfill space is rapidly decreasing and therefore landfilling cement wastes is a costly means of disposal. One alternative is to dewater the cement waste and turn it into a powder form. The cement dust is then an excellent, low cost, soil conditioner. However, its fine particle size makes it difficult to distribute to the soil.

The present invention provides an alternative disposal method by using the cement waste materials with the lime sludge alone, or in some combination with the lime sludge/ash mixture. The concrete wastes have the added benefit of providing bearing load strength to the mixture when the mixture is used as fill for the reclamation of disturbed land areas. The amount of concrete material waste to lime sludge is between 0 to 1:1 on a volume/volume basis.

The ash/cement material comprises about 5% to 50% by volume and the lime sludge between about 50% to 95% by volume of the mixture. The actual amounts used depends upon the chemical nature of the ash or cement waste materials.

Turning now to the drawings, FIG. 1 shows in schematic representation a typical equipment system and site plan of a disturbed area 10 to be reclaimed. The disturbed area 10 is some distance from a main road 12, which can be accessed from the disturbed area 10 by a secondary access road 14. The lime sludge is delivered to a staging area 16 adjacent the disturbed area 10 in watertight transport vehicles (not shown) and dumped into a lime sludge pile 18. The coal and wood ash waste materials comprised of bottom and/or precipitated fly ashes are also delivered to the staging area 16 in watertight transport vehicles and then dumped into an ash material pile 20. To control fugitive dust loss from the ash pile 20, water is sprayed over the surface of the ash pile 20. If concrete waste materials are also used, they too are delivered to the staging area 16 in watertight transport vehicles and combined with the ash waste materials in the ash pile 20. The concrete waste materials can also be formed into their own pile, separate from the residue ash pile 20.

Following a mixing analysis of the lime sludge and the ash materials, and a determination of the physical characteristics of the concrete waste materials, the mix ratios of the lime sludge with the ash materials and/or concrete waste materials is made. Since the chemical compositions of these materials vary and because state and local regulations govern the chemical composition of fill materials deposited in disturbed land areas, the actual mixing ratios of the lime sludge with the ash and/or cement materials will vary. In practice, the mixing ratios will depend on the heavy metal content of the ash waste material. Also, the greater the likelihood for the heavy metals to leach from the ash waste materials, the lower the ratio of ash waste materials to lime sludge should be. The lime sludge is alkaline and does not dissolve the fly ash, but instead stabilizes the heavy metals so that they do not leach out of the ash waste materials when they are deposited in the disturbed land area 10.

During the mixing operation, a loader vehicle 22 is used to load a quantity of ash/concrete material from the ash pile 20 into an auger 24. The auger 24 serves to grind and pulverize the ash/concrete material into evenly divided granulars having a size between about 5 mm and 15 mm. The auger 24 empties the ground up ash/concrete material into a mixer 26, which is driven by a power unit 28. At the mixer 26, a second loader vehicle 30 is used to load the lime sludge 18 into the mixer 26. In the mixer 26, the lime sludge binds with the ground up ash/concrete material to form a chemically leach resistant mixture as an aggregate 32 (FIG. 2). The mixer 26 then empties the aggregate mixture 32 into the disturbed area 10 to fill in and thus reclaim the disturbed area 10.

As shown in cross-section in FIG. 2, the disturbed area 10 is an irregularly shaped pit that has been dug into the earth 34. Although the disturbed area 10 is shown as a pit, it should be understood that the disturbed land area 10 can be the result of many different man made digs into the earth 34, such as sand pits, gravel or stone pits, quarries, strip mine areas, mined areas, borrow pits and the like. The aggregate mixture 32 is filled into the disturbed area 10 until the disturbed area 10 has nearly been raised to its original grade. A geo-textile mat 36 is then placed over the aggregate mixture 32. The geo-textile mat 36 is made of woven isotactic polypropylene material and provides ground stabilization to the aggregate mixture 32. This is especially important if the aggregate mixture 32 has been formed without using concrete waste materials, which help to cement the aggregate mixture 32 together, adding bearing strength to the filled in aggregate mixture 32. The geo-textile mat 36 can be purchased from Hausman Steel Corp., Lansing, Mich.

A six (6) to twelve (12) inch layer of yard waste compost material 38 is next placed over the geothermal mat 36 covering the aggregate mixture 32. The yard waste material 38 is generally comprised of soil, leaves, grass clippings, tree trimmings and the like that have been composed to form a nutrient rich medium for plant growth 40. The area can &:hen be seeded using any number of methods including hydro-seeding, direct drilling, broadcast seeding or aerial seeding with a seed mixture that is appropriate for the area. The waste compost material 38 along with the aggregate mixture 32 serves to bring the final grade to approximately the contour of the original grade before the area was disturbed.

It is intended that the foregoing descriptions be only illustrative of the present invention and that the present invention be limited only by the hereinafter appended claims.

I claim:

1. A method for reclaiming a disturbed land area by filling in the disturbed area with a fill mixture, which comprises:
   (a) providing a mixer means and a residue material comprised of at least one of the group of a plant ash material, a coal ash material and a concrete waste material wherein the residue material is introduced into the mixer means so that the residue material is thoroughly ground and pulverized;
   (b) mixing a lime sludge from municipal water treatment comprising calcium carbonate, magnesium carbonate and magnesium hydroxide with the residue material to render the residue material resistant to leaching and to thereby form the fill mixture; and
   (c) filling the mixture into the disturbed land area.

2. The method of claim 1 wherein a compost material is layered over the fill mixture filled into the disturbed land area and then the compost material supports a growth of cover vegetation over the fill mixture.

3. The method of claim 2 wherein a woven geo-textile mat means is layered between the fill mixture and the compost material filled in the disturbed land area.

4. The method of claim 1 wherein the plant ash material is derived from a woody plant material.

5. The method of claim 1 wherein the coal ash material is derived from combustion of a coal material.

6. The method of claim 1 wherein the lime sludge is formed as a by-product of a water purification process.

7. A mixture useful as a fill material, which comprises:
   (a) a first portion comprised of at least one of the group of a plant ash material, a coal ash material and a concrete waste material; and
   (b) a second portion comprised of a lime sludge comprising calcium carbonate, magnesium carbonate and magnesium hydroxide having a total solids content of between 10% and 45% by volume wherein the first portion to the second portion are mixed in a ratio of up to 1:1 by volume to form the fill material.

8. The mixture of claim 7 wherein the plant ash material is derived from a woody plant material.

9. The mixture of claim 7 wherein the coal ash material is derived from the combustion of a coal material.

10. The mixture of claim 7 wherein the fill material has a composition which is useful for filling in a disturbed land area to help recalim the land areas.

* * * * *

UNITED STATES PATENT AND TRADEMARK OFFICE
CERTIFICATE OF CORRECTION

PATENT NO. : 5,249,889
DATED : October 5, 1993
INVENTOR(S) : Philip E. Sierzega

It is certified that error appears in the above-indentified patent and that said Letters Patent is hereby corrected as shown below:

Column 2, line 43, "Roedioer" should be --Roediger--.

Column 5, line 5, "$Ca^{++}2OH+CO_2=CaCO_3+H_2O$" should be --$Ca^{++}+2OH+CO_2=CaCO_3+H_2O$--.

Column 5, line 10, "$MgSCO_4+Ca(OH)_2$", should be --$MgSO_4+Ca(OH)_2$--.

Column 5, line 13, "Caustic" should be --caustic--.

Column 7, line 39, "&:hen" should be --then--.

Column 8, line 49 (Claim 10), "recalim" should be --reclaim--.

Signed and Sealed this

Twenty-ninth Day of March, 1994

*Attest:*

BRUCE LEHMAN

*Attesting Officer*  *Commissioner of Patents and Trademarks*